United States Patent Office 3,085,621
Patented Apr. 16, 1963

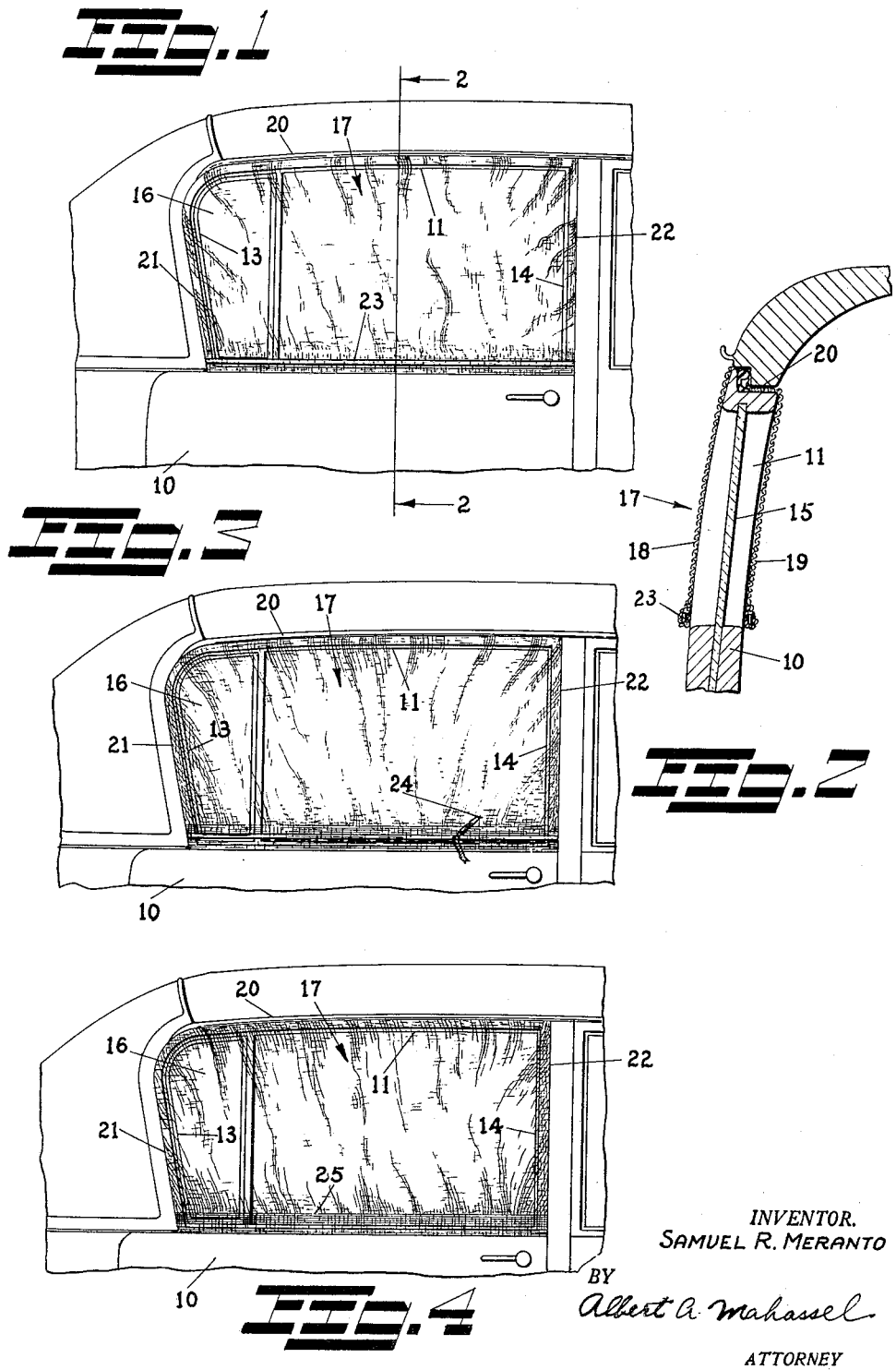

3,085,621
AUTOMOBILE WINDOW SCREEN
Samuel R. Meranto, 29 Washington St.,
Shrewsbury, Mass.
Filed Sept. 29, 1960, Ser. No. 59,385
3 Claims. (Cl. 160—91)

This invention relates to a window screen and, in particular, to a screen especially adapted for use in the windows of automobiles.

It is the general object of the invention to provide an automobile window screen which may very quickly and easily be applied to a window opening and which completely eliminates the need for any fastening means to maintain it in position.

It is a further object to provide a screen for automobile windows which may be manufactured at a minimum cost.

It is a further object to provide a screen which is completely resilient, which requires no rigid parts whatever, and which may be compacted to a very small volume so that it may easily be stored in a glove, compartment or the like when not in use.

It is a further object to provide a screen which does not interfere with the raising or lowering of a window panel when in use and which effectively seals the window opening the prevent the entrance of insects or the like into the interior of the vehicle.

It is still another object to provide a window screen which may effectively be applied to any door window of a given vehicle and to the windows of vehicles of different makes though they may vary in size or shape to some extent.

It is a further object to provide a window screen which provides maximum ventilation and which to a degree will cut down the glare of the sun.

Additional objects will be apparent from the description to follow.

Window screens of the prior art for automobiles have not come into any great commercial usage for a number of reasons, some of which are the difficulty involved in their application and removal, their expense, lack of compactness for storage when not in use, and interference with operation of the window panel. Most of the known types of screens require a relatively rigid border or framework which is attachable to the door frame by means of clips, brackets, suction cups or adhesive, thereby making their manufacture fairly expensive and requiring a relatively large storage area.

According to the present invention, all of the above disadvantages have been overcome by the provision of a screen which is completely collapsible and which is formed entirely of resilient material. Briefly, the screen comprises a pair of adjacent porous fabric members having a generally rectangular configuration similar to that of the door frame to which it is to be applied. These members are enclosed along three edges thereof and an opening is formed between the fourth edges. By means of the opening the screen is applied completely over that portion of the framework of the automobile door surrounding the window opening. Preferably, an elastic band, draw-string or the like is incorporated into the fabric along the edges forming the opening to maintain the screen taut against the framework thereby to seal the opening against the entry of insects into the vehicle. Alternatively, the draw-string or elastic band may be eliminated by forming the screen adjacent the opening at least of an elastic material.

In the drawings:

FIG. 1 is a fragmentary elevational view showing the screen applied over the exterior of an automobile door frame as seen from the exterior of the vehicle;

FIG. 2 is a sectional view taken on line 2—2 of FIG. 1;

FIG. 3 is a view similar to FIG. 1 illustrating a modified form of the invention; and FIG. 4 illustrates a still further modification.

FIGS. 1 and 2 show a portion of an automobile including a door 10 having a substantially rectangular opening 11 in the upper portion thereof. The opening is enclosed by a framework including an upper generally horizontally extending member 12 from the ends of which depend vertical members 13 and 14. A window panel 15 may be raised or lowered in the opening. A no-draft window 16 is normally enclosed within the framework.

A two-ply resilient screen generally denoted by the arrow 17 is comprised of first and second screen members 18 and 19 of mesh fabric and having a shape similar to that of the framework surrounding the window opening. The upper edge 20 and the two vertical edges 21 and 22 of the screen members are joined by seaming or any other suitable means. An elastic band 23 is incorporated into the fabric adjacent the fourth edges thereof by turning over that edge to enclose the band in a pocket and then sewing that pocket to entrap the band.

In the modification shown in FIG. 3 the elastic band is replaced by a draw-string 24 whose ends protrude out from an opening in the pocket and which may be tightened after the screen is in position.

The screen of FIGS. 1 and 3 is preferably formed with open mesh fabric of a size which will permit maximum ventilation and yet prevent the entry of insects into the vehicle. The fabric may be of natural fibers or of synthetic material. To place the screen in position it is necessary only to open the automobile door and to slip the screen by means of the opening therein completely over the upper and vertical sides of the framework until it covers the window opening. The elastic band or draw-string assure a tight fit along the lower portion of the opening.

In FIG. 4 the screen 25 is formed entirely of an elastic material, thereby eliminating the necessity for any additional contracting means along the screen opening.

It will be apparent that in any of the forms illustrated the screen does not interfere with the raising or lowering of the window panel and that it is extremely simple to place in position or to remove. Being formed entirely of fabric, the screen may be compacted into a very small space and easily be stored in the vehicle glove compartment. It can be made and sold for a very low price.

While several preferred embodiments of the invention have been illustrated and described, it is apparent that still further apparent modification may be devised without departing from the spirit or scope of the invention.

I claim:

1. In combination with a door hingedly mounted to an automobile, said door having an opening in the upper portion thereof, a framework around said opening including an upper generally horizontally extending member and side members depending from the ends of said upper member, and a window slidable into and out of said opening, a first porous screen member completely overlying substantially only the upper portion of said door including said opening and framework on one side thereof, a second similar porous screen member in opposed relation to said first screen member and completely overlying said opening and framework on the opposite side thereof, said screen members being joined along said upper and side members and being only so thick so as not to interfere with closing of said door and forming a pocket completely enclosing said upper and side members of said framework, and flexible means provided adjacent and completely around the edges of said screen members opposite said upper member to contract said last-named edges against said framework.

2. The resilient screen of claim 1 wherein said flexible means comprises a completely enclosed elastic band.

3. The resilient screen of claim 1 wherein said flexible means comprises a substantially completely enclosed draw string.

References Cited in the file of this patent

UNITED STATES PATENTS

| | | |
|---|---|---|
| 955,178 | Martin | Apr. 19, 1910 |
| 1,422,915 | Benson et al. | July 18, 1922 |
| 2,619,168 | Leverence | Nov. 25, 1952 |
| 2,665,754 | Claussen et al. | Jan. 12, 1954 |
| 2,717,036 | Harris | Sept. 6, 1955 |